United States Patent
Bartley et al.

(10) Patent No.: US 7,496,711 B2
(45) Date of Patent: Feb. 24, 2009

(54) MULTI-LEVEL MEMORY ARCHITECTURE WITH DATA PRIORITIZATION

(75) Inventors: Gerald K. Bartley, Rochester, MN (US); John M. Borkenhagen, Rochester, MN (US); Philip R. Germann, Oronoco, MN (US); William P. Hovis, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 11/457,234

(22) Filed: Jul. 13, 2006

(65) Prior Publication Data

US 2008/0016297 A1 Jan. 17, 2008

(51) Int. Cl.
*G06F 12/00* (2006.01)
(52) U.S. Cl. .................... 711/117; 711/206
(58) Field of Classification Search ............ 711/113, 711/117, 206
See application file for complete search history.

(56) References Cited

U.S. PATENT DOCUMENTS

| | | | | |
|---|---|---|---|---|
| 5,592,622 A * | 1/1997 | Isfeld et al. | ............... | 709/207 |
| 5,617,537 A * | 4/1997 | Yamada et al. | ............... | 709/214 |
| 2004/0093601 A1* | 5/2004 | Master et al. | ............... | 718/102 |
| 2005/0185463 A1* | 8/2005 | Kanamori et al. | ...... | 365/185.04 |
| 2006/0230223 A1* | 10/2006 | Kruger et al. | ............... | 711/6 |

* cited by examiner

*Primary Examiner*—Reba I Elmore
(74) *Attorney, Agent, or Firm*—Bockhop & Associates LLC

(57) ABSTRACT

In a method of controlling computer-readable memory that includes a plurality of memory locations, a usage frequency of a data unit stored in a first memory location is determined. The data unit is moved to a second memory location, different from the first memory location that is selected based on a correspondence between a known latency of the second memory location and the usage frequency of the data unit, in which the second memory location is the primary data storage location for the data unit.

19 Claims, 2 Drawing Sheets

MULTI-LEVEL MEMORY ARCHITECTURE WITH DATA PRIORITIZATION

BACKGROUND OF THE INVENTION

1. Field of the Invention

The present invention relates to computer memory management and, more specifically, to a computer architecture that stores data units based on known memory location latencies.

2. Description of the Prior Art

Virtually all computer circuits employ some sort of digital memory to store data. Such memory can include a combination of different types of memory devices, including one or more of the following: on-chip memory (such as array of registers), on board memory (such as cache memory), main memory (such as DRAM memory chips on a different circuit board from a processor), flash memory (such as memory device that can be plugged into a special reader or a USB port), and disk memory (such as a hard drive).

Some data units (which can include any method of grouping data) residing in a memory space are less-used than other data units stored on the same memory space. However, different parts of a computer's memory space exhibit different memory latencies (the amount of time it takes for data to be transferred from a memory location to the entity that requested it). For example, memory chips closest to a memory buffer are likely to have a lower latency than memory chips farther away from the memory buffer.

Most memory devices can be classified in terms of relative speed. For example, on-chip memory is usually faster that on-board memory, and both are usually much faster than disk memory. However, sometimes certain portions of a relatively slower memory device may actually have a lower latency than portions of a relatively faster memory device. Therefore, placing frequently used data units in a slower portion of the faster memory device instead of the faster portion of the slower memory device would result in an inefficient usage of memory space.

In many memory applications, dynamic random access memory (DRAM) chips are placed at similar rank positions in an array, thereby creating a flat memory structure in which all of the memory is accessible for data writes and reads equally from the memory controller. However, in current industry-standard schemes, such as fully buffered dual in-line memory module (FBDIMM), there is a non-uniform access time to each layer of memory through buffers on the memory chips. The current FBDIMM standard takes advantage of lower latencies for closer DIMM chips, but does not deliberately map heavily utilized data closer to the memory controller, or less heavily utilized data farther away from the controller.

Current memory devices include caches (for processors), which typically place data into sorted levels (L1/L2/L3), but that require space for a copy of that data be maintained either in main memory or in a direct access storage device (DASD) such as a hard drive. This is an inefficient use of memory, both in terms of added memory usage and added overhead to create copies of data and to ensure that the data are current.

Therefore, there is a need for memory management system that determines the location of where a data unit is stored based on the relative frequency of use of the data unit and the latency of the storage location.

There is also a need for a memory management system that stores data units in a hierarchical memory space, segregated according to latency, in which extra copies of the data units need not necessarily be maintained.

SUMMARY OF THE INVENTION

The disadvantages of the prior art are overcome by the present invention which, in one aspect, is a method of controlling computer-readable memory that includes a plurality of memory locations, in which a usage frequency of a data unit stored in a first memory location is determined. The data unit is moved to a second memory location, different from the first memory location that is selected based on a correspondence between a known latency of the second memory location and the usage frequency of the data unit, in which the second memory location is the primary data storage location for the data unit.

In another aspect, the invention is a method of managing a plurality of memory locations that each stores a corresponding data unit used in a computational circuit. A latency is determined for each memory location and a usage frequency determined for each data unit. At least one data unit having a high usage frequency is stored in a primary memory location having a low latency and at least one data unit having a low usage frequency is stored in a primary memory location having a high latency.

In yet another aspect, the invention is an apparatus for managing data units stored in a plurality of memory locations. Each memory location has a known latency that is classified into one of a plurality of latency classes. A usage frequency indicator is associated with each of the memory locations. An incrementer increments each usage frequency indicator each time a data unit stored in a corresponding memory location is accessed over a predetermined number of cycles. A memory controller stores each data unit in a primary memory location that is a member of a latency class corresponding to a usage frequency of the data unit.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
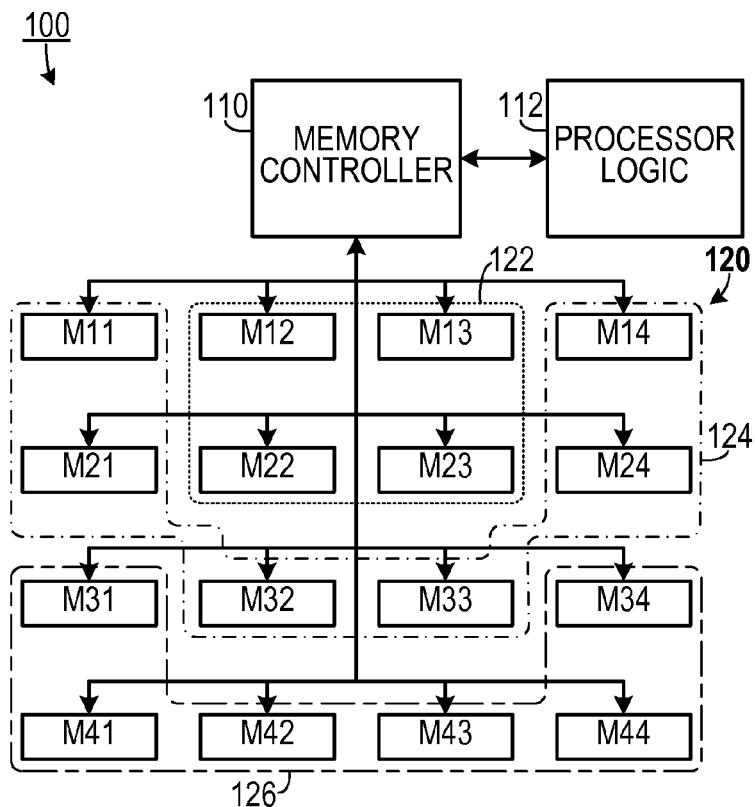
FIG. 1 is a block diagram showing a general memory classification scheme.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Also, as used herein "primary memory location" and "primary location" means a memory location at which a primary copy of a data unit is stored, whereas a "secondary memory location or "secondary location" means a memory location in which a copy of a data unit, already stored in a primary location, is stored. For example, primary locations would typically include main memory, whereas secondary locations would typically cache memory.

In certain applications, it is known that 96-99% of all memory accesses are taken from the same 25% of the memory addresses. A performance enhancement can be achieved by using a memory storage architecture which allows lesser-used data to reside in memory locations that have a relatively high latency (i.e., such as DRAM chips that are farther away from the memory controller), while data units that are more frequently used are stored in lower latency memory locations (i.e., such as in DRAM chips that are nearer to the memory controller). Such an architecture could be applied to many memory standards, including: DRAM, static random access memory (SRAM), FBDIMM memory, buffering and redriving DRAMs, flash memory, or serially-arranged DASD storage devices.

Unlike current cache memory schemes, which store frequently used data units in fast secondary memory locations (such as on board cache chips) and maintains a copy in a primary memory location (such as main memory) of each data unit stored in a secondary location, one embodiment of the present invention differentiates between latencies of primary locations. Thus, the invention treats an entire memory space (or subset thereof) as a group of primary memory locations and moves more frequently accessed data units to the lower latency primary memory locations, while moving less frequently accessed data units to the higher latency primary memory locations.

As shown in FIG. 1, one illustration of a memory management system 100 includes a memory controller 110 that controls data stored in a memory space 120 and that provides data to a processor 112 or other logic circuit. In one embodiment, the memory space 120 could include an array of main memory chips. In another embodiment, the memory space 120 could include several different memory devices, including a combination of: on-chip memory, on-board memory, main memory, etc. The memory space 120 can be grouped in terms of different physical memory units. (The physical units shown are designated M11 through M44, in which the first numeral designates a row and the second numeral designates a column in one way of visualizing the physical units.) The physical units could, for example, correspond to different memory chips, or to different memory locations in a storage device. It should be noted the representation shown in FIG. 1 is greatly simplified to facilitate ease of understanding and that many commercial embodiments could be considerably more complicated. The latency of each memory location is determined either through direct measurement or simulation and each of the individual physical memory locations is grouped into one of a plurality of latency classes according to its latency. For example, memory units M12, M13, M22 and M23 are grouped in a fast latency group 122. This could be, for example, because they are physically close to the memory controller 110 or because they employ a faster technology than the other memory locations, or a combination of the two. A medium latency group 124 includes memory locations M11, M21, M32, M33, M24, and M14. A slow latency group 126 includes memory locations M31, M41, M42, M43, M44 and M34.

The memory controller 110 assigns data units (which could denote anything from individual bytes of data to pages or other groupings) to primary memory locations based on the level of usage of each data unit. Thus, data units that have a relatively high usage frequency would be stored in memory locations in the fast latency group 122, data units that have a relatively moderate usage frequency would be stored in memory locations in the medium latency group 124, and data units that have a relatively low usage frequency would be stored in memory locations in the slow latency group 126.

Figure 2:
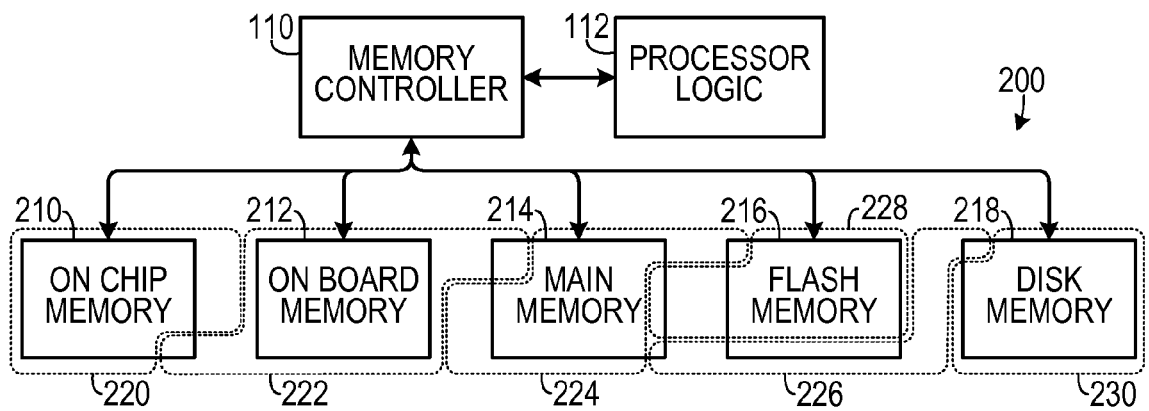
FIG. 2 is a block diagram showing a memory classification scheme employing different types of memory devices.

While in one embodiment, the invention might be applied to improve the performance of only one type of memory, such as main memory, in other embodiments, the invention may be applied to a memory space that crosses over several different memory devices. As shown in FIG. 2, a multi-device memory space 200 could include, inter alia, the following memory devices: on chip memory 210, on board memory 212, main memory 214, flash memory 216 and disk memory 218. It is possible to group the memory locations in as many different latency classes as desired, depending on the application. The example shown includes a fastest group 220 (which includes only on chip memory 210), a next fastest group 222 (which includes a slower portion of the on chip memory 210, all of the on board memory 212 and a low-latency portion of the main memory 214), a medium latency group 224 (which includes most of the memory locations from the main memory 214 and the faster portions of the flash memory 216), a medium slow latency group 228 (which includes slower portions of the main memory 214 and most of the flash memory 228), a slow latency group 226 (which includes the slowest portions of the main memory 214, the slowest portion of the flash memory 216 and the fastest portion of the disk memory 218), and a slowest latency group 230 (which includes most of the disk memory 218). In this scenario, the data units could be classified according to six different usage frequencies and stored in corresponding latency groups.

Figures 3A, 3B, 3C, 3D, 4:
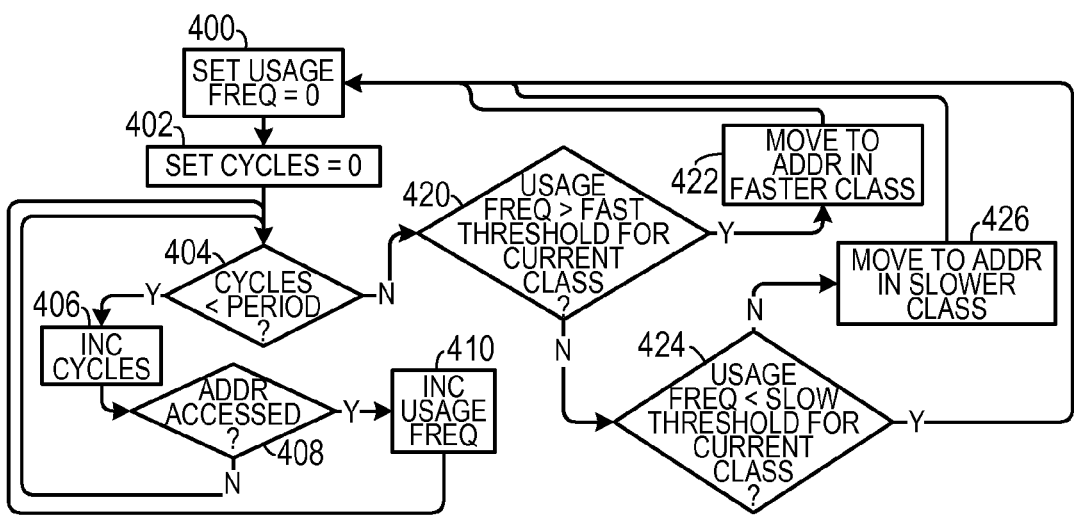
FIGS. 3A-3D are tables illustrating a representative example of latency-based memory management.
FIG. 4 is a flow chart showing a method of memory management.

One scheme that involves the generation of a memory map 300 for managing data according to usage frequency and memory location latency is shown in FIGS. 3A through 3D. In this scheme, all memory addresses are assigned to one of three latency classes: "S" (slow), "M" (medium), or "F" (fast). In one embodiment the memory map 300 could be part of a page table. This assignment would be static in most applications. Initially, as shown in FIG. 3A, each of the data units is assigned a usage frequency of "000." Each data unit can be stored in any memory location. In some embodiments, some or all of the data units may be pre-assigned a memory location based on a prediction of usage frequency. Once memory operations commence, the usage frequency associated with each memory location is incremented each time that the data unit stored therein is accessed. After a predetermined number of cycles, as shown in FIG. 3B, the usage frequency field associated with each memory location reflects the number of times that each data unit has been accessed during the predetermined number of cycles. As shown in FIG. 3C, the least accessed data units are moved to the memory locations designated as "S" (e.g., data unit "EXXXXXX," having not been accessed during the period, is moved from address "0F384," in FIG. 3B, to address "0F380," in FIG. 3C), moderately accessed data units are moved to memory locations designated as "M" (e.g., data unit "AXXXXXX," having been accessed four times during the period, is moved from address "0F380," in FIG. 3B, to address "0F385," in FIG. 3C) and frequently accessed data units are moved to memory locations designated as "F" (e.g., data unit "CXXXXXX," having been accessed seven times during the period, is moved from address "0F382," in FIG. 3B, to address "0F386," in FIG. 3C). Once the data units have been assigned to the proper memory locations, as shown in FIG. 3D, the usage frequency counters are reset to "000" and the process begins again.

A flow diagram of one way to manage memory is shown in FIG. 4. Initially, each usage frequency is set to zero 400 and a memory cycle counter is set to zero 402. A test 404 determines if the predetermined amount of time has ended. If not, the memory cycle counter is incremented 406 and the system determines 408, for each memory address, whether the address was accessed during the current cycle. If the memory was accessed, then the usage frequency corresponding to the address is incremented 410 and the system returns to step 404. If the memory not was accessed, then the system returns directly to step 404. Once the predetermined amount of time has ended, the system determines 420 for each address whether the usage frequency is greater than a "move up" threshold. If it is greater, then the corresponding data unit is moved to an address in a faster latency class. If it is not greater, then the system determines 424 whether the usage frequency is less than a "move down" threshold. If it is less that the move down threshold, then the corresponding data unit is moved to an address in a slower latency class. Otherwise, the data unit is left where it is and the system returns to step 400. The "move up" and "move down" thresholds can be static, based on a predicted number of data units within each usage frequency group, or they can be dynamic, which would allow the frequency usage groups to maintain a constant number of entries, but in which the membership criteria could change.

The invention can be applied to existing memory management schemes and can be applied to existing hardware with little or no modification. For example, an existing scheme employing cache memory, main memory and disk memory can be modified so that the memory location mapping would group existing memory units according to their respective latencies rather than the memory devices upon which they reside. One advantage of the invention over other memory schemes, such as cache memory schemes, is that it does not require the maintenance of duplicate copies of data in both a primary memory location and a secondary memory location.

In one embodiment, the method for determining memory usage would be the same, or similar, as those currently used to page memory between disk and main memory (such as DRAM). It is intended that the scope of the claims below will cover all existing schemes for paging memory in and out of disk memory and other memory types. In one embodiment, the invention can be embodied as an extension of software management of the memory latency map.

In some embodiments, a data unit access counter scheme could result in increased overhead. Also, with such a scheme, if a data unit is accessed multiple times over a short period of time and then never accessed again, its access counter would cause it to be left in a low latency memory for too long. Another mechanism for accomplishing data unit assignment could employ a scheme similar to current cache line replacement. Data units that are frequently accessed could be kept in low latency memory through use of a least recently used (LRU) scheme, generally known in the art of memory management system design. In an LRU scheme, data units are ranked on the order of their last access. When it comes time to move a data unit to a slower memory latency class, the data unit that was least recently used is moved first.

The memory latency hierarchy structure may be communicated to the memory management control software, which manages where pages are stored in the memory latency hierarchy. There may be cases where the software tracks memory pages that will always be highly used. In such a case, such memory pages (or other data units) should be pinned to the lowest latency memory locations, such as through a log file for transaction processing that uses locks (e.g., task dispatch locks) for certain data units, thereby ensuring that the data unit is always assigned to memory in a predetermined latency class.

It should be noted that the invention may be applied to the entire memory space of a computer, or a just to a subset thereof. It is intended that the scope of the claims will extend to all such scenarios.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A method of controlling computer-readable memory, including a plurality of memory locations, comprising the steps of:
    a. determining a usage frequency of a data unit stored in a first memory location; and
    b. moving the data unit to a second memory location, different from the first memory location, selected based on a correspondence between a known latency of the second memory location and the usage frequency of the data unit, the second memory location being a primary data storage location for the data unit.

2. The method of claim 1, wherein the determining step comprises counting a number of times that the data unit is accessed during a predetermined number of memory cycles.

3. The method of claim 1, wherein the first memory location is of a same physical memory class as the second memory location.

4. The method of claim 1, wherein the first memory location is of a different physical memory class as the second memory location.

5. The method of claim 1, further comprising the step of generating a memory map that groups memory locations into a plurality of latency classes, each latency class corresponding to a different range of latencies.

6. The method of claim 1, further comprising the step characterizing each of the plurality of memory locations into one of a set of latency classes based on a known latency of the memory location.

7. The method of claim 1, wherein the step of determining a usage frequency of a data unit comprises the steps of:
    a. associating a counter with the first memory location; and
    b. incrementing the counter each time the data unit is accessed.

8. A method of managing a plurality of memory locations, each storing a corresponding data unit, in a computational circuit, comprising the steps of:
    a. determining a latency for each memory location;
    b. determining a usage frequency for each data unit; and
    c. storing at least one data unit having a high usage frequency in a primary memory location having a low latency and storing at least one data unit having a low usage frequency in a primary memory location having a high latency.

9. The method of claim 8, further comprising the step of generating a memory map that groups memory locations into a plurality of latency classes, each latency class corresponding to a different range of latencies.

10. The method of claim 9, wherein the step of determining a latency for each memory location comprises the steps of determining the latency of each memory location prior to using the computational circuit so that the memory map is static.

11. The method of claim 8, wherein the step of determining usage frequency for each data unit comprises the steps of:
  a. associating a counter with each memory location; and
  b. incrementing the counter each time the data unit stored in the memory location is accessed.

12. The method of claim 11, further comprising the steps of:
  a. after a predetermined number of memory cycles, comparing a current value of the counter associated with each memory location; and
  b. determining a usage frequency of each of the data units based on the current value of the counter corresponding to the memory location that the data unit is stored in; and
  c. moving a data unit to a memory location in a latency class that corresponds to the usage frequency of the data unit.

13. The method of claim 8, wherein the data unit comprises a page of data in a page table memory management scheme.

14. An apparatus for managing data units, comprising:
  a. a plurality of memory locations, each memory location having a known latency that is classified into one of a plurality of latency classes;
  b. a usage frequency indicator associated with each of the memory locations;
  c. an incrementer that increments each usage frequency indicator each time a data unit stored in a corresponding memory location is accessed over a predetermined number of cycles; and
  d. a memory controller that stores each data unit in a primary memory location that is a member of a latency class corresponding to a usage frequency of the data unit.

15. The apparatus of claim 14, wherein the usage frequency indicator comprises a plurality of bits associated with each memory location on a page table.

16. The apparatus of claim 14, wherein at least one latency class includes memory locations from different physical memory units.

17. The apparatus of claim 14, wherein at least one physical memory unit accessible by the apparatus includes memory locations classified in different latency classes.

18. The apparatus of claim 14, wherein the plurality of memory locations include memory locations residing on different physical memory units.

19. The apparatus of claim 14, wherein the plurality of memory locations include memory locations residing on physical memory units of different types.

\* \* \* \* \*